July 14, 1953     J. J. WATTS ET AL     2,645,300
LAWN MOWER DRIVE

Filed March 15, 1948     3 Sheets-Sheet 1

INVENTORS,
John J. Watts,
BY Marion A. Summerour.
Roy E. Hamilton,
Attorney.

INVENTORS,
John J. Watts,
Marion A. Summerour.
BY
Roy E. Hamilton,
Attorney.

July 14, 1953  J. J. WATTS ET AL  2,645,300
LAWN MOWER DRIVE
Filed March 15, 1948  3 Sheets-Sheet 3
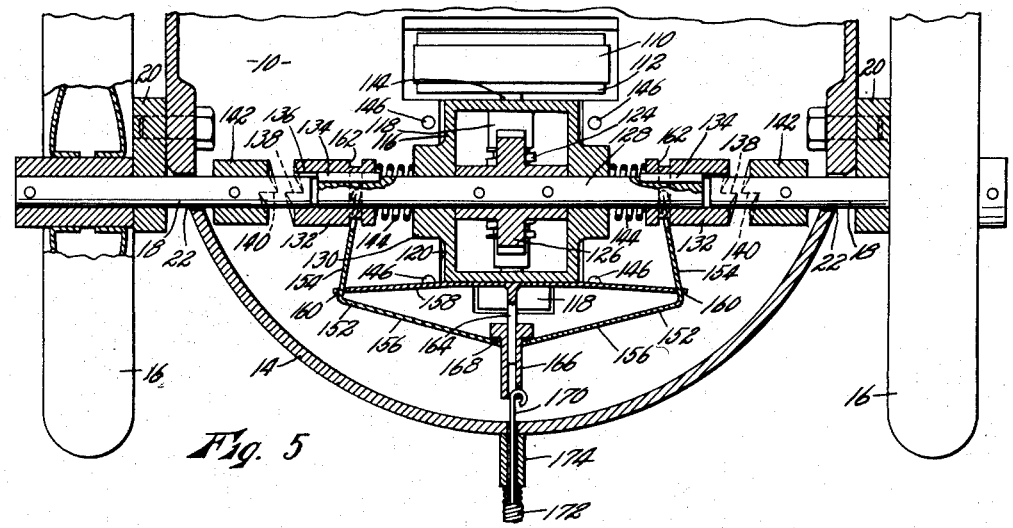
Fig. 5
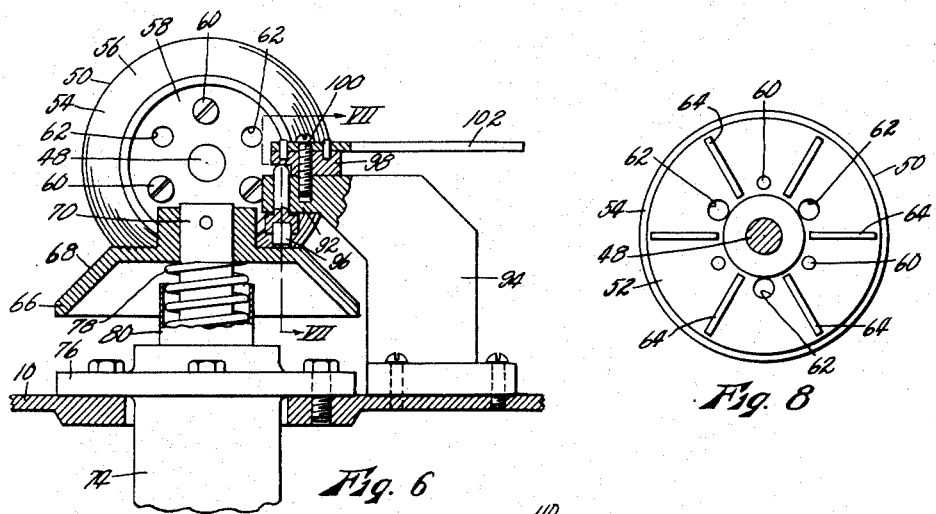
Fig. 6
Fig. 8
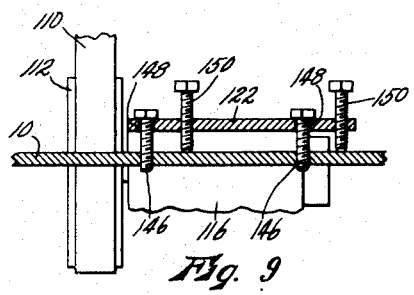
Fig. 9
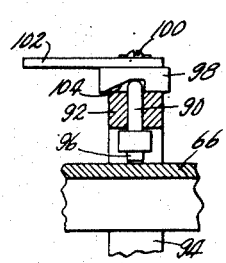
Fig. 7
INVENTORS,
John J. Watts,
Marion A. Summerow.
BY
Roy E. Hamilton,
Attorney.

Patented July 14, 1953

2,645,300

UNITED STATES PATENT OFFICE 2,645,300

LAWN MOWER DRIVE

John J. Watts, Kansas City, and Marion A. Summerour, Lees Summit, Mo.

Application March 15, 1948, Serial No. 14,964

1 Claim. (Cl. 180—76)

This invention relates to new and useful improvements in lawn mowers, and has particular reference to lawn mowers of the power operated type.

The principal object of the present invention is the provision of a lawn mower comprising a base supported by ground-engaging wheels, a cutter member carried for rotation by said base, a motor carried by said base, means operatively connecting said motor with said cutter member, and means operatively interconnecting said motor with said wheels whereby said mower is propelled, said last named means including clutches of the overrunning type whereby when said mower is turned around a corner, the outer drive wheel is allowed to rotate faster than the inner drive wheel.

Another object is the provision, in a lawn mower of the class described having a cutter member operatively connected with and driven by a motor, of a novel means for breaking the connection between said motor and said cutter member, whereby said motor may be started without load.

A further object is the provision, in a lawn mower having a base and a cutter member mounted on a shaft carried for rotation by said base, of a bevelled drive wheel mounted on said shaft, a motor mounted on said base, and a bevelled drive wheel mounted on the shaft of said motor and adapted to engage said first named bevelled drive wheel to drive said cutter member, said last named bevelled drive wheel having holes formed therethrough and fan blades carried on a face thereof, whereby air is drawn through said holes to cool said drive wheel.

Other objects are simplicity and economy of construction, ease and efficiency of operation, and adjustability for height of cut.

With these objects in view, as well as other objects which will appear in the course of the specification, reference will be had to the drawing, wherein:

Fig. 5 is an enlarged fragmentary section taken on line V—V of Fig. 4.

Fig. 6 is an enlarged fragmentary section taken on line VI—VI of Fig. 2, with parts broken away.

Fig. 7 is a fragmentary section taken on line VII—VII of Fig. 6.

Fig. 8 is a rear face view of the motor drive wheel, being an enlarged section taken on line VIII—VIII of Fig. 4.

Fig. 9 is an enlarged fragmentary section taken on line IX—IX of Fig. 2.

Figure 1:
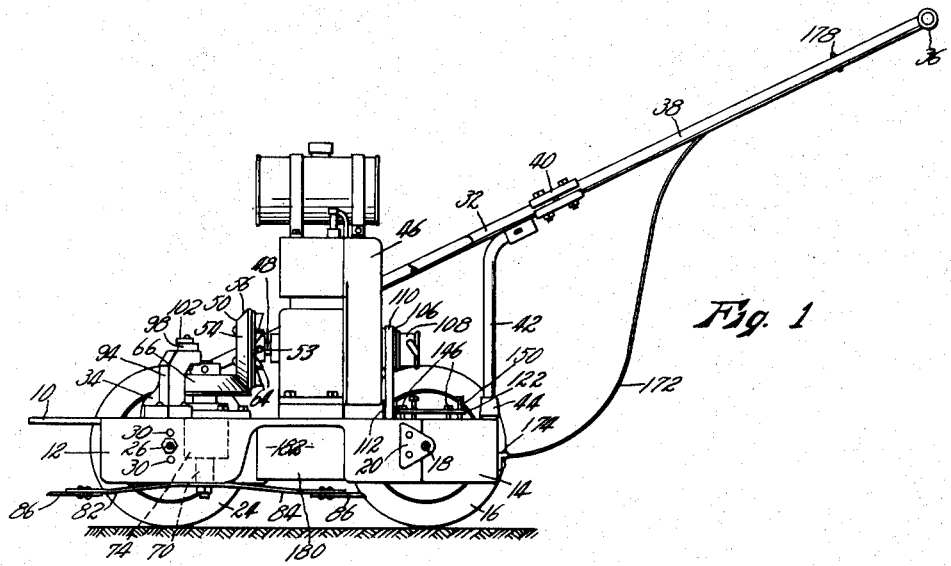
Figure 1 is a side elevation of a lawn mower embodying the present invention, with parts broken away.
Figure 2:
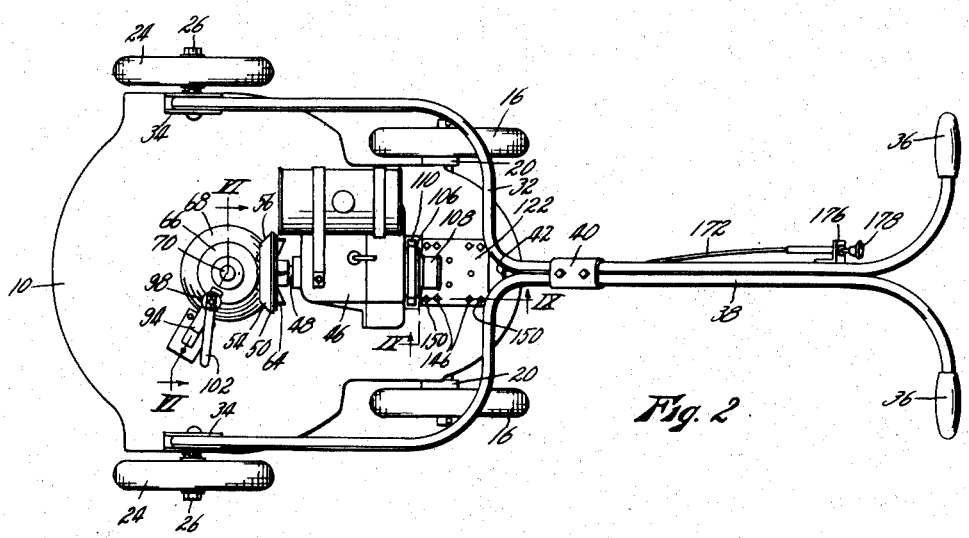
Fig. 2 is a plan view of the lawn mower.

Like reference numerals apply to similar parts throughout the several views, and the numeral 10 applies to a planar base curved at its forward and rearward edges, having depending side walls 12 along its sides adjacent the forward end thereof, and a depending wall 14 extending around the rearward portion thereof. A pair of ground-engaging wheels 16 are disposed adjacent the rearward end of the base on opposite sides thereof, each of said wheels being rigidly fixed on a transverse axle 18 carried for rotation in a bearing block 20 rigidly fixed to wall 14. Axles 20 are coaxial, and extend inwardly through holes 22 provided in wall 14. A pair of ground-engaging wheels 24 are disposed adjacent the forward end of the base at each side thereof, each of said wheels being rotatably carried on a transverse bolt 26 extending through and fixed to the adjacent side wall 12 by means of nuts 28. A plurality of vertically spaced apart holes 30 are provided in each side wall 12, into which bolts 26 may be selectively inserted to adjustably raise or lower the forward end of the base relative to the ground. A handle 32 by means of which the mower may be guided manually is forked at its lower end and the ends thereof pivotally carried in brackets 34 fixed to the upper surface of base 10, and extends upwardly and rearwardly therefrom, being provided at its upper end with hand grips 36. The upper portion 38 of said handle is fixed to the lower portion by means of clamp 40, and may be detached therefrom for ease of shipping or storage. Downward pivoting of the handle is limited by a leg 42 fixed at its upper end to said handle and equipped at its lower end with a rubber foot 44 adapted to rest on base 10.

A motor 46, which may be a gasoline engine as shown or an electric motor, is rigidly mounted on the upper surface of base 10 intermediate its ends, the shaft 48 thereof being disposed longitudinally and in spaced apart relation above base 10, and extending forwardly and rearwardly from said motor. On the forwardly extended end of said shaft is carried a drive wheel 50, best shown in Fig. 4 said drive wheel comprising a hub 52 adjustably fixed to shaft 48 by means of set screw 53 and a ring 54 carried on said hub and made of hard rubber, composition, or other suitable material, and having its outer edge portion peripherally bevelled at 56. Said ring is firmly secured to said hub by means of clamp plate 58 and screws 60. A plurality of holes 62 are formed through hub 52 parallel to shaft 48, and a plurality of fan blades 64 are formed integrally on the rearward face of said hub, whereby when drive wheel 50 is rotated, said fan blades will draw a current of air through holes 62 to cool said drive wheel by dispelling the heat generated by said wheel in frictional contact with drive wheel 66 as hereinafter described.

Drive wheel 66, having its outer edge peripherally bevelled at 68 to engage the bevelled edge 56 of drive wheel 50, is rigidly mounted on the upwardly extending end of vertically disposed shaft 70. Said shaft extends downwardly through base 10, being carried for rotational and vertical movement in ball bearings 72, which are in turn carried at the upper and lower ends of bearing tube 74. Said bearing tube is provided with an external flange 76 rigidly fixed to base 10. Shaft 70 is urged resiliently upwardly to hold drive wheel 66 in operative contact with drive wheel 50 by means of a helical compression spring 78 carried on said shaft, said spring bearing at its lower end against top bearing 72 and at its upper end against the lower face of drive wheel 66. Said spring is protected from dirt by an enclosing sleeve 80. A cutter member 82 is carried at the lower end of shaft 70, said cutter member comprising a bar 84 rigidly fixed at its midpoint to the lower end of said shaft and extending radially therefrom, and a blade 86 rigidly fixed to each end of said bar. Said blades are attached to the bar by means of rivets 88, whereby worn or damaged blades may conveniently be replaced.

It will be noted that the bevelled surface of drive wheel 50 is somewhat narrower than the bevelled face of drive wheel 66, and that by loosening set screw 53 wheel 50 may be moved forwardly or rearwardly to ride higher or lower on drive wheel 66. In this manner the speed of drive wheel 66 and of the cutter member driven thereby may be adjusted to a certain degree.

As best shown in Figs. 6 and 7, a plunger 90 is carried for free vertical sliding movement in horizontal arm 92 of bracket 94, said bracket being rigidly secured to the upper surface of base 10 adjacent drive wheel 66 and arm 92 thereof extending over the upper face of said drive wheel. Said plunger is rounded at its upper end and has a recess formed at its lower end to receive a bearing member 96 made of fiber or other suitable material, said bearing member to rest in contact with the upper surface of drive wheel 66. A cam 98 is oscillatably carried at the upper surface of arm 92 adjacent plunger 90 by means of screw 100, said cam being manually oscillatable by means of a handle 102 fixed thereto. A tapered recess 104 is formed in the lower surface of cam 98, and plunger 90 normally extends upwardly into said recess. Thus when cam 98 is turned by handle 102 through a partial revolution, plunger 90 will be forced downwardly, and said plunger will in turn force drive wheel 66 downwardly against the force of spring 78, thus breaking the connection between said drive wheel and drive wheel 50, and disconnecting the cutter member from the motor. This disconnection is ordinarily necessary to allow motor 46 to be started under no load. Furthermore, plunger 90 will act as a brake for retarding and stopping the rotation of drive wheel 66 and cutter member 82 after they have been lowered by said plunger.

Since the cutting by blades 86 is performed principally at the forward portion of the blade orbit, the height of cut may be varied by raising or lowering the forward end of base 10 as previously described.

A pulley 106 is rigidly mounted on the rearwardly extended end portion of shaft 48 of motor 46, and in case motor 46 is a gasoline engine, a hollow hub 108 suitable for receiving the usual rope starting lanyard may be fixed securely to the rearward face of said pulley as shown. Said pulley is operatively connected by means of belt 110 with a pulley 112, said pulley being rigidly mounted on a shaft 114 disposed longitudinally to base 10 and extending through the upper portion of gear box 116 and supported by bearings 118 formed integrally with said gear box. Said gear box is fixed at its top side to a mounting plate 122 disposed just above base 10, and extends downwardly through a hole 120 provided therefor in said base. Said mounting plate is adjustably secured to base 10 by means hereinafter described.

A worm gear 124 is carried rigidly on shaft 114 within gear box 116, and meshes with a pinion 126 fixed on shaft 128, said shaft extending through gear box 116 transversely to base 10 beneath shaft 114, and carried for rotation in bearings 130 formed integrally with said gear box. Said shaft extends outwardly from the sides of the gear box, and is coaxial with rear wheel axles 18, the outer ends of said shaft being slightly spaced apart from the inner ends of said axles. A clutch sleeve 132 is carried for axial sliding movement on each end portion of shaft 128, being restrained from rotation thereon by means of key 134 fixed longitudinally in the surface of said shaft and extending into matching longitudinal groove 136 formed internally in said clutch sleeve. The outer end portion of each of the clutch sleeves extends outwardly past the end of shaft 128 to enclose the inner end portion of the adjacent axle 18, and the outer end surface of said clutch sleeve is formed to present jaws 138 adapted to engage jaws 140 of clutch member 142, which is rigidly fixed to axle 18. Each of clutch sleeves 132 is urged outwardly into engagement with the associated clutch member 142 by means of a compression spring 144 carried on shaft 128, said spring bearing at one end against the clutch sleeve and at its opposite end against gear box 116. Thus motor 46, acting through pulley 106, belt 110, pulley 112, shaft 114, worm gear 124, pinion 126, shaft 128, clutch members 132 and 142, and axles 18, turns ground engaging wheels 16 to propel the mower over the ground.

It is apparent that shaft 128 may be adjusted to accurate coaxial alignment with axles 18, and the tension of belt 110 may be adjusted, by means of a gear box mounting means best shown in Fig. 9. Mounting plate 122, to which gear box 116 is fixed, overlaps the edges of hole 120 in base 10, through which the gear box depends. A screw 146 extends through loosely fitting holes 148 provided therefor adjacent each corner of plate 122 within the overlapping portions thereof, and is threaded at its lower end into base 10. A screw 150 is threaded through plate 122 adjacent each of screws 146, and bears at its lower end against the upper surface of base 10. Thus it is apparent that by selectively loosening and tightening screws 146 and 150, gear box 116 may be positioned to align shaft 128 with axles 18, and may be rotated slightly around shaft 128 to adjust the tension of belt 110.

Referring principally to Fig. 5 it will be seen that the clutch operating mechanism includes a pair of substantially horizontal angled operating levers 152 each having a forwardly extending arm 154 and an inwardly extending arm 156. Said operating levers are respectively pivotally supported adjacent the angles thereof at the opposite ends of a support arm 158 fixed to gear box 116 by welding or other suitable means and extending transversely outwardly therefrom, said pivot points being indicated at 160 in Fig. 5. The forwardly extending arm 154 of each operating lever is disposed within a peripheral groove 162 formed externally in the adjacent clutch sleeve 132, and the inwardly extending arms 156 of said levers terminate in closely spaced apart relation adjacent the longitudinal centerline of the mower. A rearwardly extending horizontal rod 164 is fixed to support arm 158 at said centerline. A sleeve 166 is carried for sliding movement on said rod extending between the ends of arms 156. Said sleeve is provided with an external shoulder 168 adapted to engage arms 156 to move them rearwardly. Control wire 170 is fixed to the rearward end of sleeve 166 and extends rearwardly through wall 14 and through a flexible conduit 172, said conduit being secured at one end to wall 14 by means of bracket 174, and secured at its opposite end to handle 32 by means of bracket 176, in a position conveniently accessible to the operator. The end of wire 170 projecting from the upper end of conduit 172 is provided with a handle 178 by means of which the wire may be pulled or pushed through the conduit.

When handle 178 is pulled rearwardly, wire 170 pulls sleeve 166 rearwardly on rod 164, and shoulder 168 of said sleeve contacts and moves the inner ends of arms 156 of levers 152 rearwardly, pivoting them at 160. The forward ends of arms 154 of said levers are thus moved inwardly, and force clutch sleeves 132 inwardly on shaft 128 against the pressure of springs 144, thus disengaging said clutch sleeves from clutch members 142 carried on wheel axles 18 and disconnecting the wheels from the power drive previously described. When handle 178 is pushed forwardly, sleeve 166 will be moved forwardly, and clutch sleeves 132 will be forced outwardly by springs 144 to the engaged position as shown in Fig. 3.

It will be noted that the back faces of the jaws 138 and 140 of clutch members 132 and 142 are inclined so that the clutches are effective to drive wheels 16 in one direction only, that is forwardly, in the manner of a ratchet. The mower may be pushed over the ground faster than shaft 128 is being driven, clutch members 142 in that case pushing clutch sleeves 132 inwardly on shaft 128 and riding over the jaws 138 thereof. Thus when it is desired to turn the mower in a curve or around a corner, the operator merely swings the mower so that the wheel 16 on the outer side of the curve turns more rapidly than the wheel on the inside of the curve. When the mower is again straightened, both of the clutches will, of course, be engaged by the force of springs 144 to drive both of wheels 16 at equal speeds.

An arcuate guard wall 180 concentric with cutter shaft 70 is fixed to the lower side of base 10 and depends therefrom just forwardly from gear box 116 and pulley 112. The function of this wall is to prevent grass and other cuttings from being thrown rearwardly by the blades to foul the wheel driving and clutch mechanism.

Figures 3, 4:
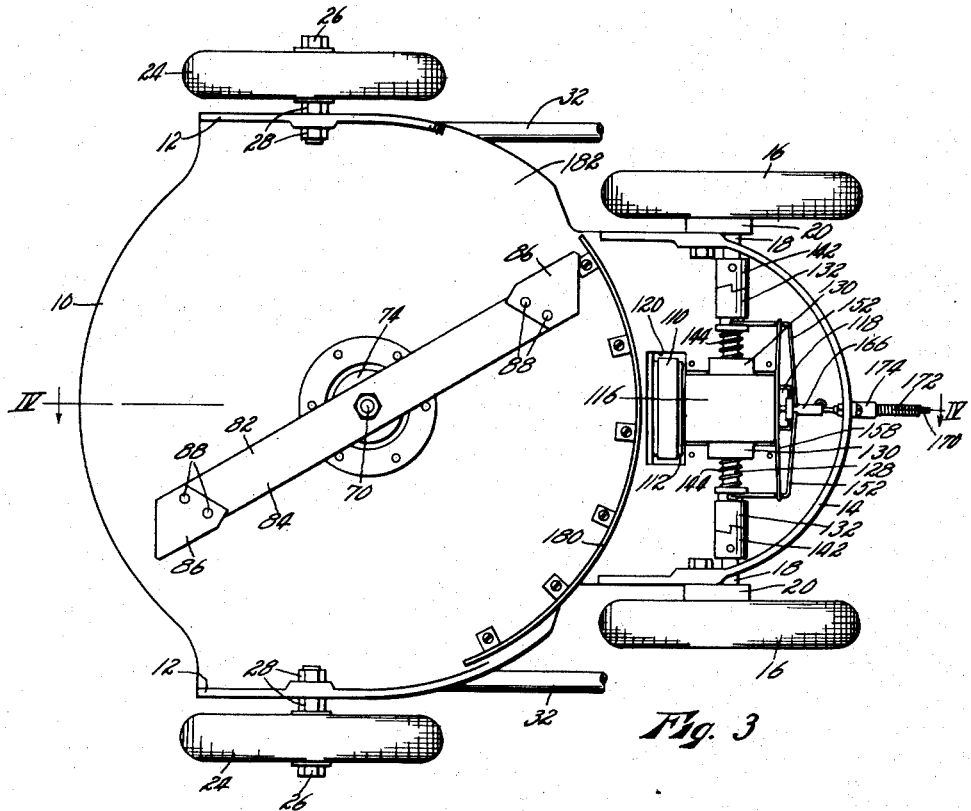
Fig. 3 is an enlarged inverted plan view of the lawn mower, with parts broken away.
Fig. 4 is a fragmentary section taken on line IV—IV of Fig. 3, with certain parts left in elevation.

Thus it will be seen that such cuttings as are not discharged beneath the lower edges of walls 12 and 180 will be discharged through port 182, being the space between the spaced apart ends of wall 180 and wall 12, as shown in Figs. 1 and 3.

While a specific embodiment of my invention has been shown and described, it is apparent that many minor variations of construction and design could be made without departing from the spirit of the invention.

What we claim is:

In a lawn mower of the class described having a base and a motor carried by said base, a pair of transversely spaced apart wheels in axial alignment fixed to axles carried for rotation by said base, a gear reduction unit carried by said base disposed intermediate said wheels and having its outwardly extending output shaft coaxial with said axles, means operatively interconnecting said motor with said gear reduction unit, a jawed clutch member carried for longitudinal sliding movement on each end portion of said output shaft, a jawed clutch member fixed to each of said axles and adapted to be engaged by the adjacent slidable clutch member to drive said wheels, resilient means urging said slidable clutch member outwardly toward the engaged position, a pair of angled levers carried pivotally by said base, one arm of each of said levers having abutting connection with one of said sliding clutch members and the opposite arms of said levers being in close juxtaposition, a rod disposed adjacent said last named lever arms in the plane of said levers, a sleeve carried slidably on said rod and having a shoulder adapted to engage said lever arms, and means for moving said sleeve on said rod, whereby said levers are pivoted to disengage said slidable clutch members from said fixed clutch members.

JOHN J. WATTS.
MARION A. SUMMEROUR.

References Cited in the file of this patent

UNITED STATES PATENTS

| Number | Name | Date |
|---|---|---|
| 462,558 | James | Nov. 3, 1891 |
| 491,736 | Jackson et al. | Feb. 14, 1893 |
| 777,229 | Vaughn | Dec. 13, 1904 |
| 1,805,927 | Sharp | May 19, 1931 |
| 2,243,133 | Steiner et al. | May 27, 1941 |
| 2,278,922 | Goodall | Apr. 7, 1942 |
| 2,374,533 | Fulton | Apr. 24, 1945 |
| 2,429,378 | Stuebner | Oct. 21, 1947 |
| 2,474,524 | Hawke | June 28, 1949 |
| 2,500,077 | Howard | Mar. 7, 1950 |
| 2,502,696 | Barnes | Apr. 4, 1950 |
| 2,522,112 | Gilmour | Sept. 12, 1950 |
| 2,540,350 | Root | Feb. 6, 1951 |
| 2,546,265 | Kelsey | Mar. 27, 1951 |
| 2,547,401 | Loewe | Apr. 3, 1951 |
| 2,547,738 | Bosworth | Apr. 3, 1951 |
| 2,552,583 | Phelps | May 15, 1951 |

FOREIGN PATENTS

| Number | Country | Date |
|---|---|---|
| 447,708 | France | Jan. 13, 1913 |
| 440,216 | Great Britain | Dec. 23, 1935 |